(12) United States Patent
Anderson

(10) Patent No.: US 7,542,994 B2
(45) Date of Patent: Jun. 2, 2009

(54) GRAPHICAL USER INTERFACE FOR RAPID IMAGE CATEGORIZATION

(75) Inventor: Eric Anderson, Gardnerville, NV (US)

(73) Assignee: Scenera Technologies, LLC, Portsmouth, NH (US)

( * ) Notice: Subject to any disclaimer, the term of this patent is extended or adjusted under 35 U.S.C. 154(b) by 257 days.

(21) Appl. No.: 11/388,517

(22) Filed: Mar. 24, 2006

(65) Prior Publication Data

US 2007/0226255 A1     Sep. 27, 2007

(51) Int. Cl.
*G06F 17/00*     (2006.01)
*G06F 15/16*     (2006.01)

(52) U.S. Cl. .................... 707/104.1; 715/243; 715/764

(58) Field of Classification Search ............... 707/104.1
See application file for complete search history.

(56) References Cited

U.S. PATENT DOCUMENTS

| | | | |
|---|---|---|---|
| 5,493,677 A * | 2/1996 | Balogh et al. ............ | 707/104.1 |
| 6,396,963 B2 | 5/2002 | Shaffer et al. | |
| 6,408,301 B1 | 6/2002 | Patton et al. | |
| 6,629,104 B1 * | 9/2003 | Parulski et al. .............. | 707/102 |
| 6,804,684 B2 | 10/2004 | Stubler et al. | |
| 2002/0140843 A1 | 10/2002 | Tretter et al. | |
| 2004/0135815 A1 | 7/2004 | Browne et al. | |
| 2005/0050043 A1 | 3/2005 | Pyhalammi et al. | |
| 2005/0192924 A1 * | 9/2005 | Drucker et al. ................ | 707/1 |
| 2005/0209992 A1 * | 9/2005 | Kikinis et al. ................. | 707/1 |

* cited by examiner

*Primary Examiner*—Tony Mahmoudi
*Assistant Examiner*—Dennis Truong

(57) ABSTRACT

A method and system are provided for rapid categorization of digital images. Aspects of an exemplary embodiment include arranging a plurality of image objects representing respective image files in a source stack within a presentation space of a display; arranging a first set of category objects representing respective image categories along a perimeter of the source stack of image objects; arranging a second set of category objects representing respective image categories along the perimeter of the source stack of image objects; visually indicating within the presentation space of the display which one of the first and second category sets is a primary set and which one is a secondary set; associating a primary key input with a category object in the one of the first and second category sets indicated as the primary set, and associating a secondary key input with a category object in the one of the first and second category sets indicated as the secondary set; and in response to receiving one of the primary and secondary key input, associating an image file corresponding to a top image object in the source stack with the image category represented by the category object associated with the received key input.

39 Claims, 6 Drawing Sheets

GRAPHICAL USER INTERFACE FOR RAPID IMAGE CATEGORIZATION

FIELD OF THE INVENTION

The present invention relates to computer-implemented method and system for categorizing digital images using a large set of categories.

BACKGROUND OF THE INVENTION

As digital photography and the digitization of old photographs become more and more prevalent, the number of digital images that are stored and archived will increase dramatically. Whether the digital images are stored locally on a user's PC or uploaded and stored on a Web photo-hosting site, the number of images will make it increasingly difficult for a user to find desired images.

To alleviate this problem, computer applications are available today that allow a user to categorize images using several different approaches. The simplest approach displays a set of thumbnail images of the user's photos and allows the user to enter properties, such as caption, date, photographer, description, and keywords, for each thumbnail image. The user may then search the entire photo collection by entering desired properties/keywords as search terms. Because this approach requires the user to retype much of the category information entered for each image, a more common approach today allows the user to associate category information with images through a program having a graphical user interface for sorting and categorizing images.

One example of this type of program is ADOBE PHOTOSHOP ALBUM STARTER EDITION, by ADOBE, San Jose, Calif., which organizes and finds images using tags. This program displays thumbnail images in one pane and a list of icons representing category tags, such as favorites, family, events, and so on, in a tag pane. To attach a tag to an image, the user drags the tag from the tag pane into the desired image using a mouse. The user may create new tag categories as well as create multiple levels of subcategories. Tags may be attached to multiple images by the user selecting one or more images and selecting one or more tags, and then either dragging the selected tags onto any of the selected images, or dragging the selected images onto any of the selected tags. After attaching tags to the images, the user can perform searches based on the tags to find images having matching tags.

Although tag-based programs, such as PHOTOSHOP, allow the user to sort images into multiple categories by dragging and dropping tags and/or images, these programs have drawbacks. One drawback is that these types of programs require the user to first individually select a set of tags before dragging the image to the tags, or to manually drag each desired tag to the image. This constant selection of tags can be cumbersome and time consuming especially for an image that fits into many different categories.

A second image categorization approach is described in U.S. patent application No. 2005/0192924 entitled "Rapid Visual Sorting of Digital Files and Data", published on Sep. 1, 2005. This application describes a sorting program having a user interface that displays a filmstrip or timeline view of a set of digital images to be sorted. The user scrolls through using left and right cursor keys, which moves the image forward or backwards in the timeline. A currently selected image is presented during scrolling such that it stands out from the others in the timeline, such as by being displayed larger than the rest. Other images are displayed on either side of the selected image in an almost fully visible manner to provide context as those images immediately in time nearby the selected image. The user interface also displays category areas above and/or below the set of images. If one category area is displayed above and one below, then image sorting may be accomplished via up and down cursor keys, as indicated to the user by guide arrows displayed on the screen. By using left and right cursor keys to stop on a selected image and then using the up or down cursor keys, the user can assign a photograph to a category. If more than one category is displayed above and/or below the timeline, then the user can use the keyboard and/or can drag the currently selected image to one of the categories and release. Once an image is moved to a category, metadata regarding the category is assigned to the image.

Although this type of sorting program alleviates the problem of the user having to constantly select desired categories prior to sorting each image, this sorting program also includes a drawback shared by tag-based programs. The drawback has to do with the fact that for many users, there may be sets of images that may fit into many different categories (e.g., more than two or four). Although a user may be able to create additional categories, for each new category created, traditional programs require additional screen real estate to display each added category. After the user creates all the categories he or she may need, traditional programs may not be able to display all the categories on the screen at once. Patent application 2005/0192924 is silent as to what happens when the user creates more category areas than available within the window or screen area. And programs, such as PHOTOSHOP, which display a list of category icons, would presumably provide the tag pane with scroll bars to allow the user to scroll through the list of category tags. In this instance, the user may be forced to repeatedly scroll back and forth through the list of the category tags to select desired categories for each image to be sorted, which is inefficient and time-consuming.

BRIEF SUMMARY OF THE INVENTION

A method and system for rapid categorization of digital images are described. Aspects of an exemplary embodiment include arranging a plurality of image objects representing respective image files in a source stack within a presentation space of a display; arranging a first set of category objects representing respective image categories along a perimeter of the source stack of image objects; arranging a second set of category objects representing respective image categories along the perimeter of the source stack of image objects; visually indicating within the presentation space of the display which one of the first and second category sets is a primary set and which one is a secondary set; associating a primary input with a category object in the one of the first and second category sets indicated as the primary set, and associating a secondary input with a category object in the one of the first and second category sets indicated as the secondary set; and in response to receiving one of the primary and secondary inputs, associating an image file corresponding to a top image object in the source stack with the image category represented by the category object associated with the received key input.

According to the method and system disclosed herein, category objects are grouped into category sets, the category sets are displayed such that category objects of only the primary category set are visible any given time, but a visual indication, such as names, of the category objects available in the other category sets is also provided. Accordingly, the number of different categories contemporaneously made available to the user for sorting images can be significantly increased over the number of categories displayed in conventional image GUIs.

DETAILED DESCRIPTION OF THE INVENTION

A method for categorizing digital images using a large set of categories is described. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the systems, devices, and networks usable with the present invention can take a number of different forms. The present invention will also be described in the context of particular methods having certain steps. However, the method and system operate effectively for other methods having different and/or additional steps not inconsistent with the present invention.

An exemplary embodiment provides a graphical user interface for an image management application that allows the user to quickly and easily associate metadata describing category information with digital files.

Figure 1:
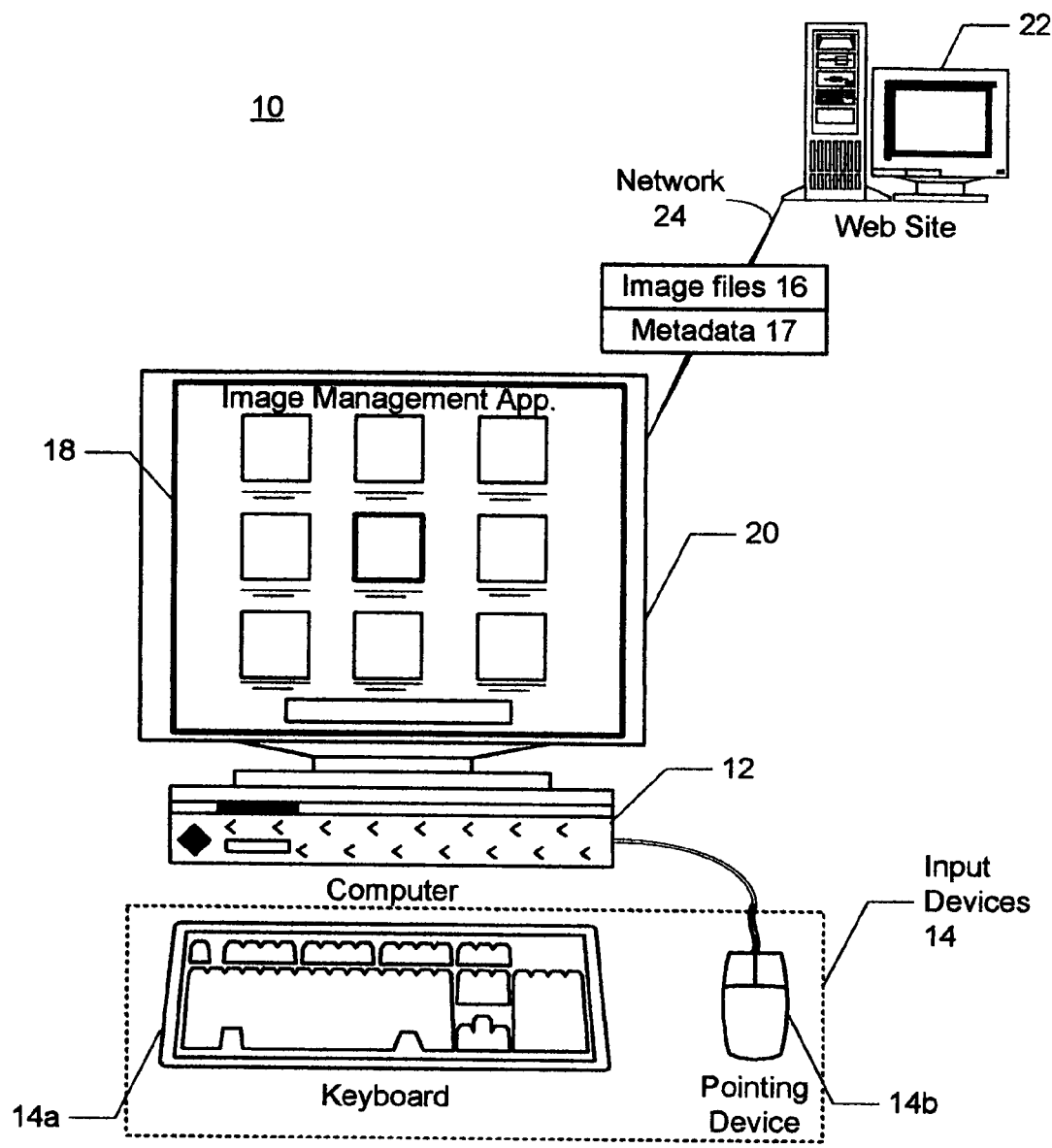
FIG. 1 is a block diagram illustrating an image categorization system in a preferred embodiment.

FIG. 1 is a block diagram illustrating an image categorization system in a preferred embodiment. The system 10 includes a computer 12, such as workstation or PC, that a user interacts with via a display 20 and input devices 14, such as a keyboard 14a and a pointing device 14b (e.g., a mouse and/or a trackpad). The system 10 may store and access many different types of data objects, typically in the form of files, including email and digital images. Digital image files 16, for example, may be input into the system 10 from a variety of sources, such as a digital camera, a CD (Compact Disc) or DVD (Digital Versatile Disk) ROM (Read Only Memory), a disk, a scanner, or downloaded via a network 24, for instance. Data objects, including the image files 16, are stored in a memory and manipulated via software, such as an image management application 18, that is executed on a processor (not shown).

The image management application 18, which is implemented in accordance with the preferred embodiment, provides a graphical user interface that enables a user to rapidly sort and categorize the image files 16 into any given number of categories. The image management application 18 stores the sorted images along with the category information, preferably as metadata 17, for later retrieval and searching. The category information associated with the images may be stored within image files themselves or separately from image files. The images and category information may be stored locally on a storage device (not shown), such as a hard drive, CDR (Compact Disc Recordable) or writeable DVD, or high-capacity disk. The images and category information may also be uploaded for storage on a Web-hosting photo site 22 via the network 24, such as Internet. In one embodiment, the image management application 18 may not only allow the user to organize and sort image files 16 based on categories, but also to perform other conventional image management functions, such as image editing, printing, and sharing via e-mail or web posting. The image management application 18 may be a standalone application program, or may comprise a component of another image management application. The image management application 18 may also be implemented as part of an operating system.

In one embodiment, the image management application 18 is executed by the computer 12. It should be readily understood that the computer 12 could be implemented as a dedicated box that displays the image management application 18 and the images on a display, such as television, for instance. In a second embodiment, the image management application 18 is executed by a remote server and displayed on the computer's monitor 20 via the network 24. In a third embodiment, the image management application 18 is executed on a digital camera, or other electronic image device, that may be equipped with a display 20 and input devices 14, such voice recognition and/or a stylus for input of the data.

Figure 2:
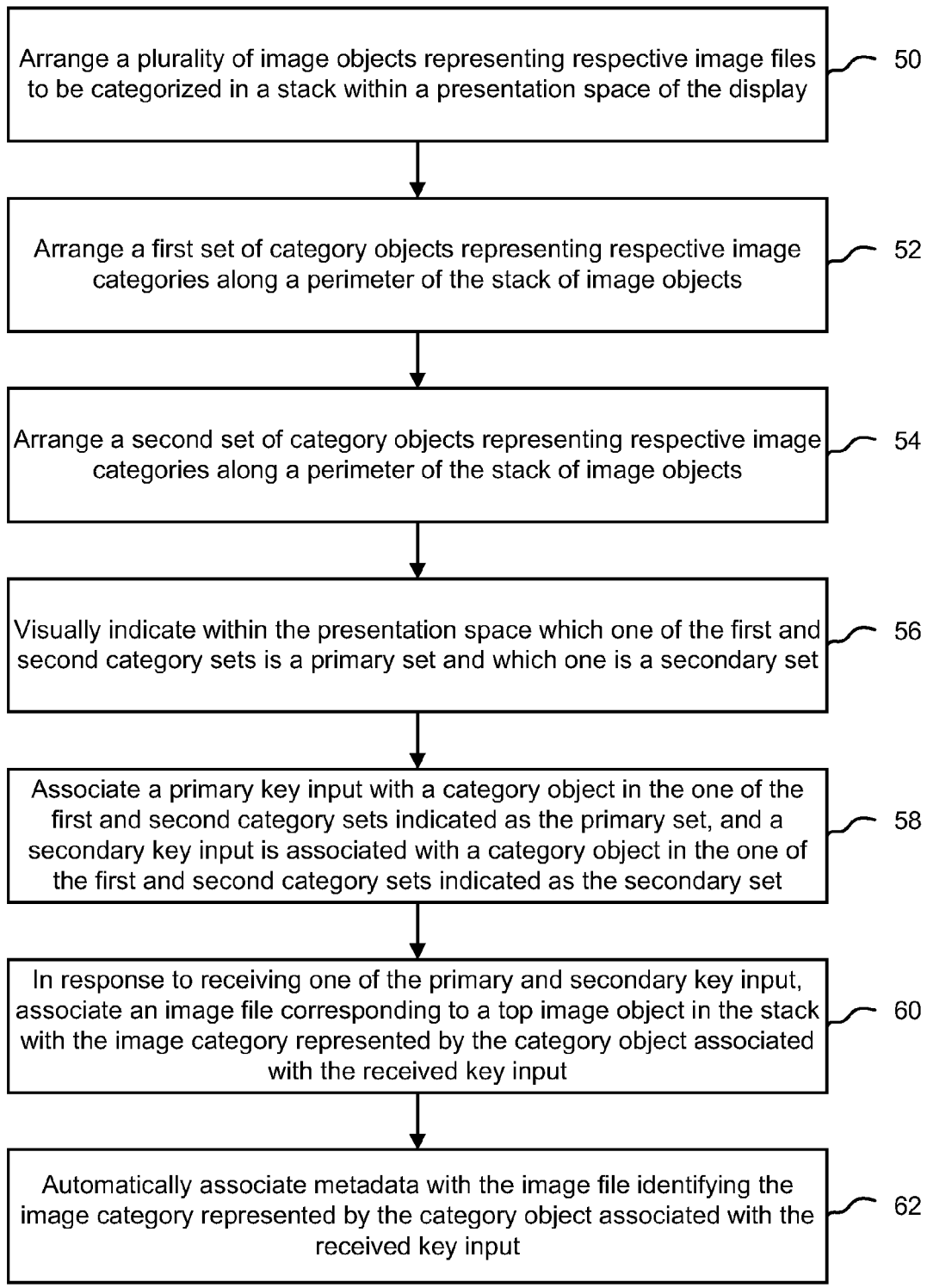
FIG. 2 is a flow chart illustrating the process performed by the image management application to enable the user to categorize digital image files in accordance with an exemplary embodiment.

FIG. 2 is a flow chart illustrating the process performed by the image management application 18 to enable the user to categorize digital image files 16 in accordance with an exemplary embodiment. The process for categorizing images begins in step 50 by arranging a plurality of image objects representing respective image files 16 to be categorized in a source stack within a presentation space of the display. In step 52, a first set of category objects representing respective image categories are arranged along a perimeter of the source stack of image objects. In step 54, an arrangement of a second set of category objects representing respective image categories are displayed along the perimeter of the source stack of image objects.

Figure 3:
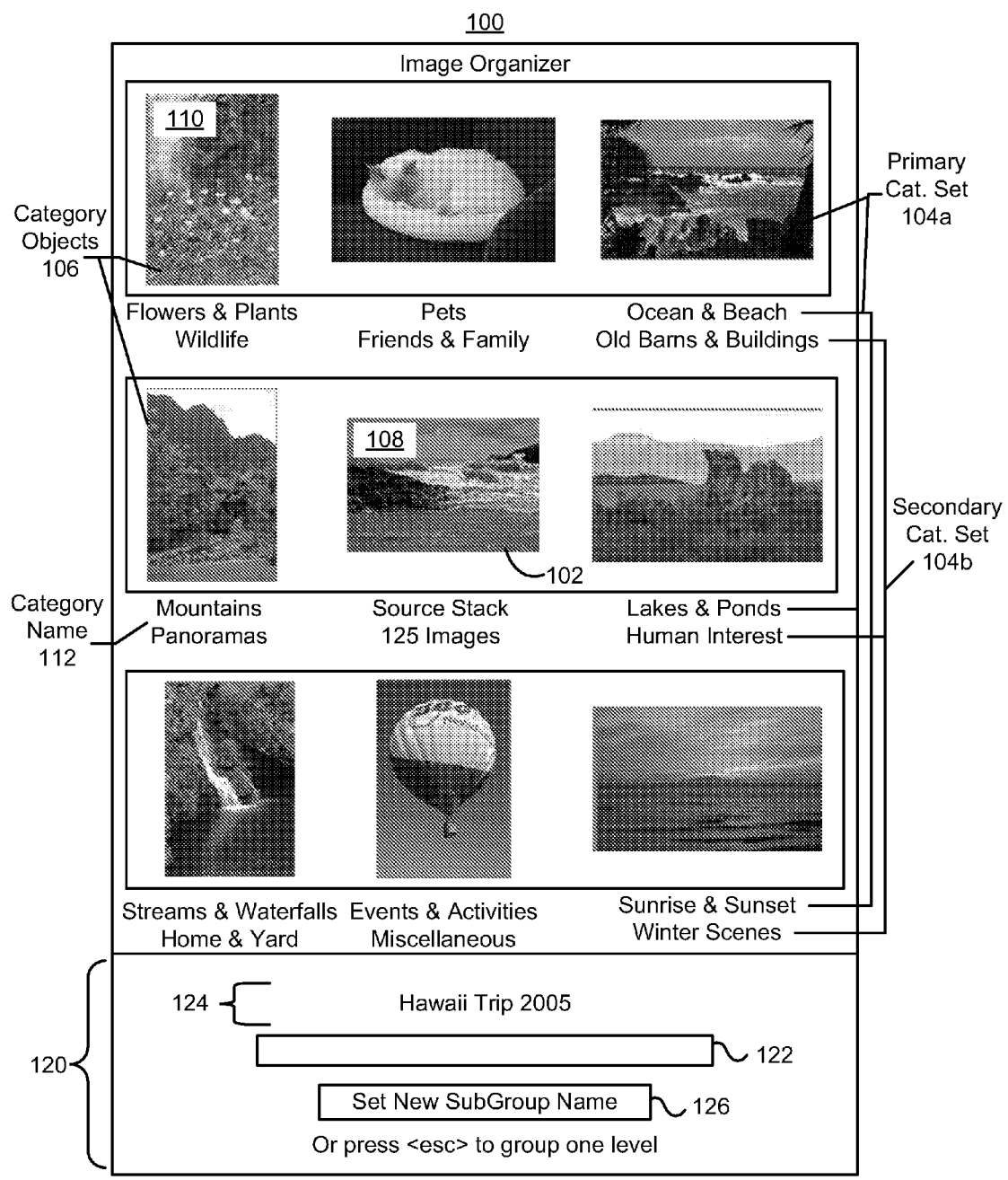
FIG. 3 is a block diagram illustrating an example graphical user interface (GUI) of the image management application displayed by the method of FIG. 1.

FIG. 3 is a block diagram illustrating an example graphical user interface (GUI) 100 of the image management application 18 displayed by the method of FIG. 1. According to the exemplary embodiment, image files 16 input into the system 10 that are to be categorized by the image management application 18 are displayed in the form of a source stack 102, preferably near the center of the presentation space of the GUI (step 50). Although the source stack 102 may include many image objects, the image objects in the source stack 102 are arranged such that a top image object 108 overlaps other image objects in the source stack 102 and only the top image object 108 is viewable and selectable by a user. In an exemplary embodiment, the image objects used to represent the image files 16 are thumbnail images, as shown. However, icons may also be used to represent the image files 16. To aid in efficiently categorizing the images, the image files 16 to be categorized may be ordered in the source stack 102 by time and date of capture to take advantage of the fact that photographs are related by time and subject matter, with the general principle being that the closer in time the images were taken, higher degree of subject matter correlation. According to the exemplary embodiment, the thumbnail images are sorted in the source stack 102 by ascending date (oldest on top) of the corresponding to the image files 16. As shown in the example, the source stack 102 may be displayed highlighted and with an indication of the number of images (e.g., 125) are represented in the source stack 102.

In accordance with the exemplary embodiment, the GUI 100 further includes two or more category sets 104a and 104b (collectively category sets 104), each including multiple category objects 106 displayed around the perimeter of the source stack 102 that represent different categories into which the top image object 108 from the source stack 102 can be placed for automatic categorization (step 54). In the example shown, the category sets 104 each include eight category objects 106; a row of three category objects 106 above the source stack, a row of three category objects 106 below the source stack 102, and one category object 106 on either side of the source stack 102. However, a category set 104 may include any number of category objects 106. Corresponding category objects 106 in each of the category sets 104 are preferably located along the perimeter of the source stack 102 in the same location.

Referring again to FIG. 2, after the source stack and category sets are displayed, in step 56, a visual indication is displayed within the presentation space of which one of the category sets is a primary set and which one is a secondary set. Referring to the example in FIG. 3, the category set 104a is the primary category set 104a and category set 104b is the secondary category set. When a category set 104 is made the primary category set 104a, that category set 104 becomes active and the category objects 106 in the primary category set 104a are viewable in the presentation space. In the exemplary embodiment, the category objects 106 in the primary category set 104a are displayed overlaid on top of other secondary category sets 104b. In one embodiment, the category sets 104 may be prioritized based on use, such that the most commonly used category set 104 is by default always displayed as the active or primary category set 104.

Referring again to FIG. 2, in step 58, a primary input is associated with a category object in the one of the first and second category sets indicated as the primary set, and a secondary input is associated with a category object in the one of the first and second category sets indicated as the secondary set. In step 60, in response to receiving one of the primary and secondary inputs, an image file corresponding to a top image object in the source stack is associated with the image category represented by the category object associated with the received key input. In step 62, in response to the image file corresponding to a top image object in the source stack being associated with the image category, metadata is automatically associated with the image file that identifies the image category represented by the category object associated with the received key input.

The user is allowed to associate the top image 108 in the source stack 102 with a particular category object 106 using the input devices 14. Using input devices such as a pointing device and/or keyboard keys, e.g., 4-way arrows, alt/ctrl, spacebar and the numeric keypad, a user can rapidly sort images in the source stack 102 into the different category sets of category objects 106 surrounding source stack 102. There are two embodiments for allowing the user to associate the top image 108 in the source stack 102 with a particular category object 106 using the input devices 14.

In a first embodiment, the user is allowed to associate the top image 108 in the source stack 102 with a particular category object 106 by using a pointing device 14b to drag and drop the top image into any of the category objects 106 in the primary category set 104a. According to this embodiment, the placement of the source stack 102 in the middle of the category objects 106 provides the shortest drag-and-drop distance from the center source stack 102 to each of the category objects 106, which may increase the speed at which the user can sort the images.

In a second embodiment, the user is allowed to associate the top image 108 in the source stack 102 with a particular category object 106 by pressing a primary key on the keyboard 14a. According to this embodiment, the category objects 106 in the category sets 104 are associated with a set of keys on the keyboard, referred to herein as primary keys, each, in relation to the other keys in the set, representing a direction of movement away from the source stack 102. For example, assuming that the source stack 102 is surrounded by four category objects 106, such that a respective category object 106 is displayed above, below, to the left and to the right of the source stack 102. In this case, <up arrow>, <down arrow>, <left arrow>, and <right arrow> keys on the keyboard 14a, may be each assigned to the category objects 106 positioned in the corresponding direction 104 so that the user can press the respective arrow keys to indicate the direction the top image 108 in the source stack 102 will be moved and associated with the category object 106, similar to a joystick.

In the example shown in FIG. 3, the source stack 102 is surrounded by eight category objects 106. In this case, the category objects 106 may be assigned to the location of keys on a numeric keypad on the keyboard 14a, which is laid out as follows:

<7> <8> <9>

<4> <5> <6>

<1> <2> <3>

The location of the center key <5> may represent the centrally located source stack 102, and the location of keys 1-4 and 6-9 relative to the center key <5> may be assigned to the corresponding locations of the category objects 106 around the source stack 102. Note that any number of keys the on the keypad may be assigned to a corresponding number category objects 106 in a category set 104.

Once the top image 108 from the source stack 102 is assigned to one of the category objects 106, the top image object 108 is removed from the source stack 102 (revealing the next image to be sorted) and is displayed as the top image 110 in the category object 106. In the exemplary embodiment, each category object 106 itself may be arranged as a stack or deck of images such that only the last image object placed into the category object 106 is viewable as the top image object 110 in the category object 106. In one embodiment, the user may repeatedly click on the category object 106 or the source stack 102 to remove the top image object 110 and 108 and reveal the next image object, thereby cycling through the images stored therein. Thus, similar to the source stack 102, each category object 106 may be considered a stack of images. In a case where the user mistakenly moves an image object from the source stack to a particular category object 106, the image object can be moved back to the source stack 102 by simply dragging and dropping it or by entering an undo command (e.g. "<ctrl> z"), revealing the previous image in the category object 106.

In a further aspect of the present embodiment, the image management application 16 includes a copy operation that allows the user to assign an image object 108 to more than one category object 106 before moving on to the next image in the source stack 102. In this embodiment, the user associates the image object 108 with more than one category object 106 by pressing a modifier key while assigning the image from the source stack to a category object 106. This results in the image object 108 being displayed as the top image in both the category object 106 and the source stack 102. In a preferred embodiment, a faded representation of the image on the source stack may be displayed to indicate a copy operation is being performed. While continuing to press the modifier key, the user may assign the faded image object from source stack 102 to as many other category objects 106 as desired. When the user releases the modifier key the faded top image object is permanently moved from source stack 102. The result of the copy operation is that the image object appears as the top image object 110 in each of the category objects to which the image object was assigned. In an alternative embodiment, the user may terminate the copy operation by pressing another key, such as <enter>, to return to the last state.

In both embodiments described above for allowing the user to assign an image from the source stack 102 to a category object 106 in the primary category set 104a, a secondary key (e.g., <ctrl>, <alt>, or <spacebar>) is assigned to allow the user assign an image from the source stack 102 to a category object 106 in the secondary category set 104b by pressing and releasing a secondary key, or by pressing and holding the secondary key in combination with the primary key, such as <ctrl>+<left arrow>. When the user assigns the top image object 108 from the source stack 102 to a secondary category set 104b using the secondary key, the primary and secondary category sets 104a and 104b are automatically exchanged and a visual indication is given of the exchange. That is, when the image management application 18 receives the secondary key input, the primary and second category sets 104 are arranged in the presentation space such that the category set currently indicated as the active primary category set 104a becomes an inactive secondary category set, and the category set currently indicated as the secondary category set is displayed as the new active the primary set.

In the exemplary embodiment shown, each category object 106 includes a thumbnail of the last image assigned to the category object 106, and a text description, describing the corresponding category, such as a category name 112. Both the top image object 110 and category name 112 (e.g., "Flowers & Plants") of the category objects 106 in the primary category set 104a are displayed. In accordance with the exemplary embodiment, the category names 112 of the category objects 106 in the secondary category set 104b are displayed adjacent to the category objects 106 and corresponding names 112 in the primary category set 104a. Preferably, the category objects in the currently active primary category set 104a are displayed with large and dark category names 112, while the category names in the inactive secondary category set 104b are displayed smaller and dimmer. Although only one secondary category set 104b is shown, any number of secondary category sets may be shown by displaying a list of the inactive category names, depending on the size of the presentation space. Alternatively, only a certain number of available inactive category sets may be displayed by displaying only the active category set and the category names in the next category set.

Figure 4:
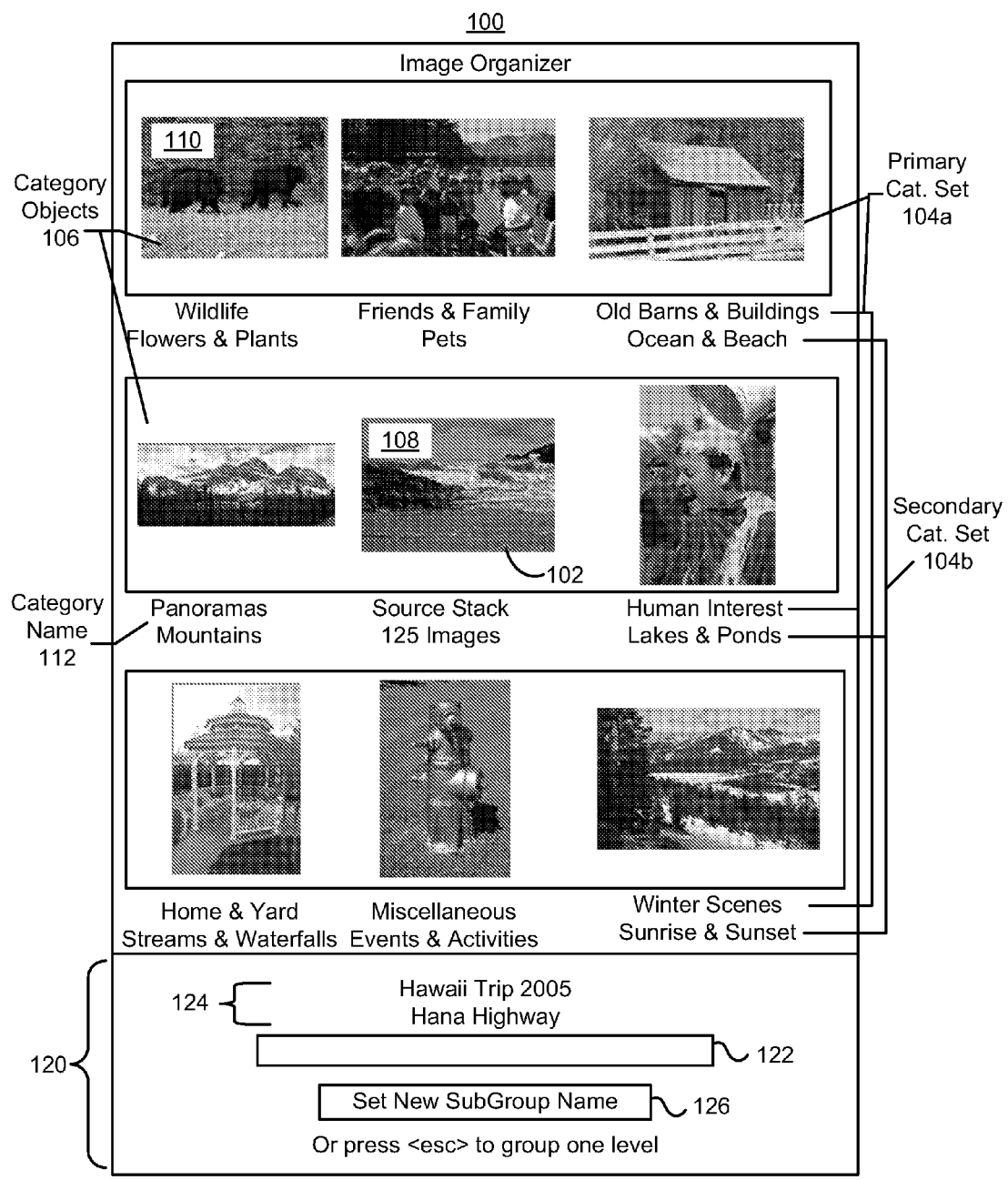
FIG. 4 is a block diagram illustrating the example GUI of the image management application after the primary and secondary category sets of FIG. 3 have been switched.

FIG. 4 is a block diagram illustrating the example GUI 100 of the image management application after the primary and secondary category sets of FIG. 3 have been switched. The secondary category set from FIG. 3 is now displayed as the primary category set, resulting in both the top image 110 and category name 112 (e.g., "Wildlife") of the category objects 106 in the primary category set being displayed, while the category names 112 of the new inactive secondary category set are displayed de-emphasized (e.g., "Flowers & Plants"). If there are more than two category sets 104, the activation of the secondary key causes the category sets to cycle through being the active primary category set. Thus, by pressing the secondary key, the image management program 16 steps through the category sets 104.

Switching between the active or primary category set 104a and an inactive or secondary category set 104b set may be temporary or permanent. In a temporary switch, the secondary category set 104b is made active primary category set 104a only for a predefined period of time, after which, the original primary category set 104a is automatically switched back to being active. Alternatively, a modifier key, such as <shift>, <ctrl>, or <alt> may be used, where the category switch is active until the modifier key is released. In a permanent switch, the secondary category set 104b becomes the primary category set 104a and remains so until the user manually performs a category switch.

Switching between sets of categories using a secondary key has the following advantages. Normally, a user does not try to sort a random set of images that were collected haphazardly. Rather, the images in the source stack 102 are typically a stream of images taken during one or more image capture sessions, typically from a single camera. Because of this, there is a natural time and location correlation between images, which aids the process of cataloging.

According to one exemplary embodiment, the user may create his or her own category objects 106 and group the category objects into category sets 104 as appropriate to make the sorting process more efficient. One method for making the sorting process more efficient is to create the category sets 104 such that there is a correlation between the type of activities and objects the user photographs and the category objects 106 in a particular category set 104. By doing so, advantage can be taken of the time correlation between the images to be sorted. Because of the fact the user does not switch between one venue and another except over time when capturing images, when the user switches from the primary category set 104a to another during the sorting process, the new primary category set will probably be the one the user continues to use for a number of shots before the category sets need to be switched again because of the time correlation factor between the images in the source stack 102. In the exemplary embodiment, the user may include a category in more than one category set 104. This capability will reduce the requirements to switch between category sets 104 during the sorting of a given venue.

Another method of making the sorting process efficient is to create the category sets 104 such that category objects 106 related to one another between category sets 104 overlay one another in the same location. For example, in FIG. 3, the "Flowers & Plants" category in the primary category set 104a overlays the "Wildlife" category in the secondary category set 104b, and the "Pets" category object overlays the "Friends & Family" category object. Here, there is a close correlation between the categories "Flowers & Plants" and "Wildlife", and a close correlation between the categories "Pets" and "Friends & Family". While the user is sorting image objects 108 from the source stack 102 into the "Pets" category, it is natural that some of the image objects 108 may also include friends and family members. Therefore, as the user sorts the image objects 108, the user may press the secondary key to toggle back and forth between the "Pets" category 106 and the "Friends & Family" category object 106 to rapidly sort and categorize the stack of image objects 108.

In the categorization process described above, category names 112 are essentially keywords that are associated with an image. According to a further embodiment, the user is allowed to enter a hierarchy of venue descriptions, which are also associated with sorted images as metadata to further categorize the image objects. Whereas categories group images by subject or type, the venue descriptions are used to add venue specific metadata to the images. The venue descriptions are further organized into hierarchies to allow the creation of subgroups that essentially group the images by location over time.

Referring to FIG. 3, the GUI 100 may be provided with an area for displaying venue information 120. The venue information 120 may include a text entry field 122 to enter venue descriptions, a list of hierarchical venue descriptions 124, and a control (e.g., a button) 126 to enter a venue subgroup description. A key may be associated with the venue information 120, such as the "escape" key to navigate the list of hierarchical venue description 124 (e.g., pressing <escape> goes up one level). According to the exemplary embodiment, any venue descriptions contained in the hierarchical venue description list 124 during image categorization are automatically associated with those image objects, eliminating the need for the user to type in the venue description for each of the images. For example, in the example shown in FIG. 3, while categorizing images from the source stack 102, the user has entered a venue description of "Hawaii trip 2005", which is displayed in the hierarchy list 124, to indicate where the images were captured. The venue description "Hawaii trip 2005" will be added as metadata to images sorted from the source stack 102, until the user presses the key to move up a level in the list of hierarchical venue descriptions 124.

FIG. 4 shows an example where the user has entered a subgroup venue description, which is added to the hierarchical venue description list 124. In this example, the first place the user went on his trip to Hawaii and took pictures was Hana Highway. Thus, the user has entered "Hana Highway" in the text entry field 122 and pressed the "set new subgroup name", which displays "Hana Highway" under the "Hawaii trip 2005" in the list of hierarchical venue descriptions 124. When the user subsequently assigns images from the source stack 102 to category objects 106, all of the venue descriptions in the hierarchical venue description list 124, i.e., "Hawaii trip 2005" and "Hana Highway", will be automatically associated with the images as metadata along with the respective category names 112 of the corresponding category objects 106.

Continuing with the Hawaii vacation example, assume that the user visited a waterfall along Hana Highway and took pictures of a waterfall. During image sorting, when the user see the first shot of the waterfall displayed in the source stack 102, the user enters the name of the waterfall in the venue information area 120 to set a new subgroup name. As the user assigns images from the source stack 102 to the "Streams & Waterfalls" category object, the images will be tagged with the name of the waterfall, "Hawaii trip 2005", and "Hana Highway" venue descriptions as well as with the with the category name 112 "Streams & Waterfalls". After the user finishes sorting the last image from the waterfall, the user may press the venue information key, <escape>, to go up to the "Hana Highway" level (deleting the waterfall name), and continue to sort the images in the category objects as appropriate.

Thus, items in the hierarchical venue description list 124 are automatically inherited by each image object 108 that the user moves from the source stack 102 to a category object 106. As described in U.S. Pat. No. 6,862,038, which is assigned to the assignee of the present application and herein incorporated by reference, the hierarchical venue descriptions are used to represent levels of conceptual correlation between adjacent images in the source stack 102 that are ordered by time and date. That is, the highest-venue description level is used to represent high-level concepts pertaining to the images, while the lowest-venue description level is used to represent detail-level concepts pertaining to the images. As a user moves from one image to the next a source stack 102 during categorization, the data corresponding to the high-level concepts in the highest-venue description level will change least frequently, while the data corresponding to low-level concepts in progressively lowest-venue description levels will change with progressively higher frequency.

Grouping categories into category sets, and displaying the category sets such that category objects of only one category set are a visible any given time, but the names of category objects in the other category sets are always displayed, has the following advantages. By displaying the category objects around the perimeter of the source stack, and by displaying the category objects themselves as image stacks, the number of different categories contemporaneously made available to the user for sorting images can be significantly increased over the number of categories displayed in conventional image GUIs. Also, the area required to display each category is reduced by displaying category objects 106 in the form of stacks of images, thus saving screen real estate to allow even more categories to be displayed for image sorting. By displaying the names of the category objects in the secondary category sets along with the category objects from the primary category set, the user can see what categories are available, without have to scroll to see those that are not visible on the screen, as in conventional sorting applications. By associating the category objects arranged around the source stack to the layout of primary keys on the keyboard, the user can more rapidly sort images from the source stack 102 into the surrounding category objects 106 than through the use of a mouse, since the user can easily memorize the key layout and associations with the category objects.

Figure 5A:
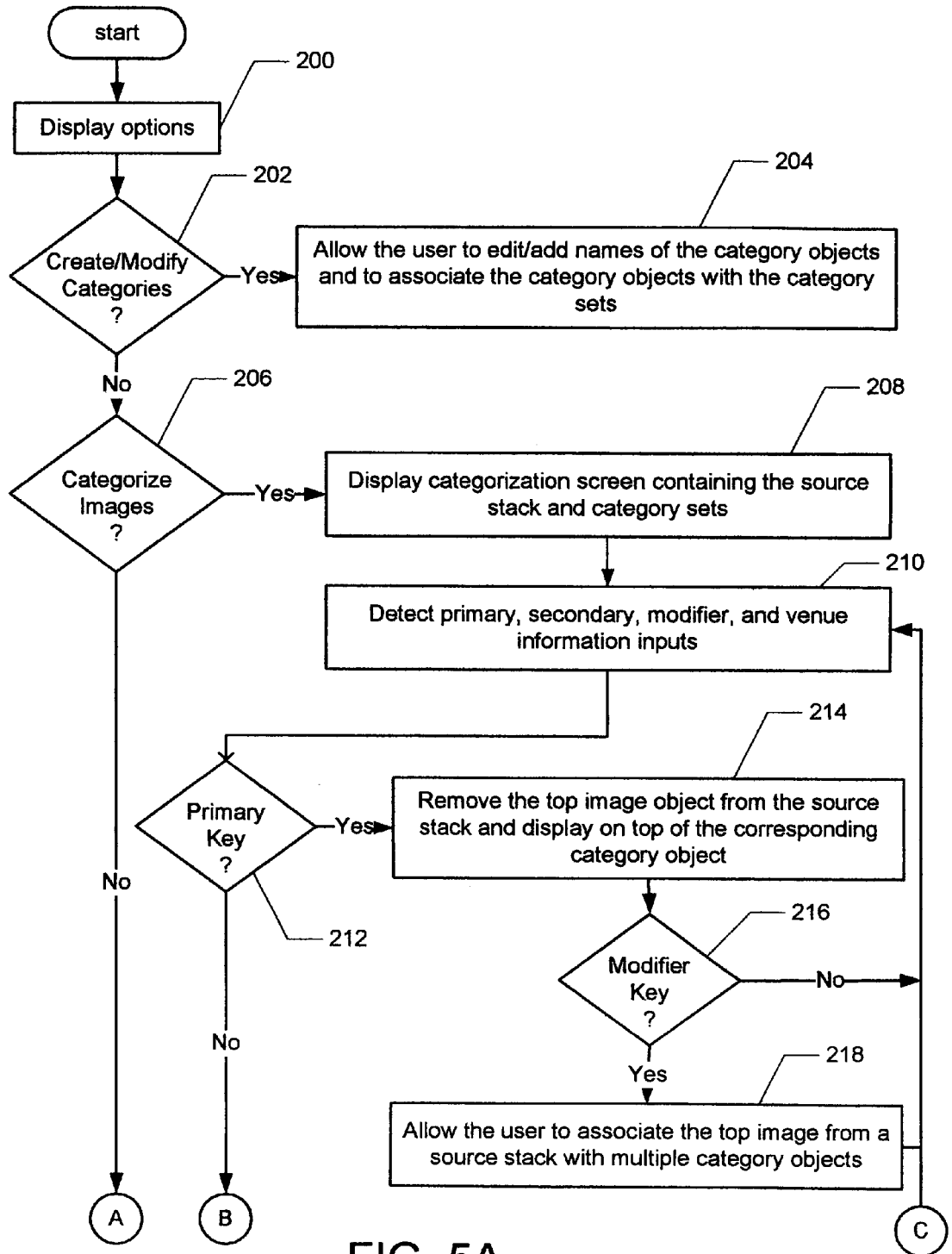
FIGS. 5A and 5B are diagrams illustrating an example implementation of a process flow performed by the image management application.
Figure 5B:
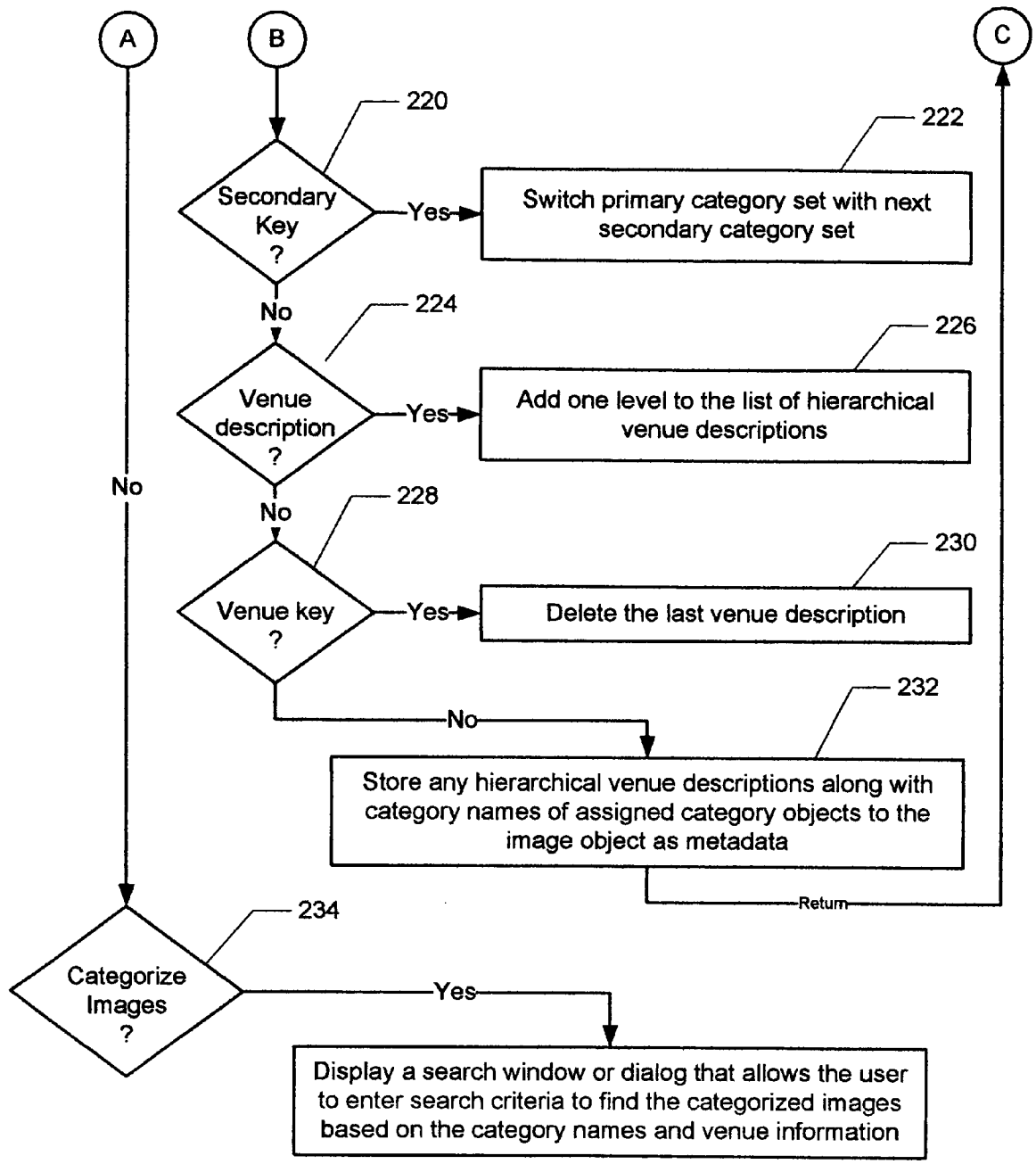

FIGS. 5A and 5B are diagrams illustrating an example implementation of a process flow performed by the image management application 18. Upon startup, the image management application 18 in step 200 provides options that allow the user to "Create/Modify Categories", "Categorize Images", and to "Search for Images". A variety of user interface techniques may be used to provide these options, such as displaying the options in a menu, a pull-down list, as hyperlinks, in dialog boxes, and as buttons displayed in the presentation space.

If the user selects the option to "Create/Modify Categories" in step 202, then in step 204, the image management application 18 may display a screen or window displaying the names of existing category objects and their association with any existing category sets, and allow the user to edit or add to the names of the category objects 106 and to associate or re-associate the category objects 106 with existing or new category sets 104. In one embodiment, a list of categories may be prioritized by user (e.g., highest frequency at top of list) and a predetermined number of the highest prioritized categories (e.g., 8) are successively added to the category sets.

For example, the top eight may be used as the default primary category set 104a, the next most likely 8 categories may be added to the first secondary category set 104b, and so on.

If user selects the option to "Categorize Images" in step 206, then in step 208, the image management application 18 displays the categorization screen containing the source stack 102 and category sets 104, as described in FIG. 2. This step may include allowing the user to specify a storage location of the images to be categorized or automatically or manually finding new images input to the system 10 and displaying them as the source stack 16.

In step 210, during categorization the image management application 18 detects activation of primary, secondary, modifier, and venue information inputs from the input devices 14. In step 212, if an input associated with a primary input, such as a drag-and-drop or a primary key, is detected, then in step 214, the top image object from the source stack 102 is removed and displayed as the top image object in the corresponding category object. In step 216, if an input associated with a modifier key is detected during a primary input, then in step 218, the image management application 18 enters a copy state that allows the user to associate the top image from a source stack 102 with multiple category objects 106. During the copy state, top image object is displayed at the top of the assigned category objects 106, but is not removed from the source stack 102.

Continuing with FIG. 5B, in step 220, if an input associated with the secondary key is detected, then in step 222, the primary category set 104a is switched with the next secondary category set 104b. In step 224, if it is detected that the user enters a venue description and presses the "New Subgroup Name" control 126, then in step 226, one level containing the venue description is added to the list of hierarchical venue descriptions 124 as a subgroup to any previously entered venue description. In step 228, if an input associated with the hierarchical venue description key is detected (e.g., <escape> key), then in step 230, the last venue description in the list of hierarchical venue descriptions 124 is deleted, thereby moving the user up one level in the venue label hierarchy, and that level is blanked or deleted. Thus, moving up one level is the same is deleting the lowest defined level, and offering the text input 122 as a means of entering a new label.

In step 232, the image management application 18 stores any hierarchical venue descriptions along with category names 112 of category objects assigned to the image object as metadata 17, and the process continues receiving user input in step 210. Preferably, the category names 112 and the venue descriptions in the hierarchical venue description list 124 are stored in the image metadata 17 as a priority list, where the venue descriptions are stored hierarchically according to subgroup names, and category names are stored at the bottom of the order list. The priority list may be ordered based on the order that the venue descriptions and category names were assigned to the image based on user input. Priority in this case can be represented by relative position in the priority list. In a preferred embodiment, the venue descriptions have a higher priority in the priority list than the category names. For example, the category name 112 of the first category object 106 that an image is assigned to has a higher priority in the list than the category name 112 of the second category object 106 that the image was assigned to. Any venue descriptions, such as "Hawaii trip 2005", are stored at a higher priority than the category names 112.

In a further embodiment, the process may include the optional steps of saving the state of the source stack 102, the category objects and any venue hierarchy information 120 when the image management program shut-downs, so that when the program is re-opened, the last state of venue hierarchy information can be retrieved and be displayed along with the last state of the source stack 102 and category objects. In this embodiment, when the program is opened, a startup procedure sets-up the categorization screen by opening the image database and extracting venue category object information metadata from previously sorted images.

If the user selects the option to "Search for Images" in step 234, the image management application in step 212 displays a search window or dialog that allows the user to enter search criteria to find the categorized images based on the category names and venue information. When the user submits the search, e.g., by pressing the enter key or a "go" button, the search engine searches the images for metadata satisfying the search criteria and displays the results on the screen. Although the search function is shown as being implemented by the image management application 18, the search function may be implemented in a separate application from the image management application 18.

In the exemplary embodiment, search criteria may be entered in two different formats. In one format, the user enters one the more keywords in a text dialog box as the search criteria that spans all category names and venue descriptions. In this type of search, a search engine disregards the order of category names and venue descriptions in the priority list. For example, the user may enter a query to find all waterfall images that were taken in Hawaii by entering the terms "waterfall" and "Hawaii". The result of the search would be at all images containing both terms in the priority list.

In a second format, the user enters keywords and specifies relationships between the keywords to perform a hierarchical keyword search. In one embodiment, the user enters a search that specifies relationships between keywords using mathematical operators such as greater than (>) and less than (<). When a search is requested having a mathematical operator placed between two keywords (e.g., "Pets>Hawaii"), then to satisfy the search criteria, the first word has to have a higher priority (be on a higher level) in the metadata priority list in a given image than the second word. Using the hierarchical venue descriptions to create subgroups of images by location over time provides the user with a two dimensional way to sort images.

A method and system for rapid image categorization has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

What is claimed is:

1. A method for image categorization, comprising:
    displaying a source stack within a presentation space of a display that represents a set of one or more digital images to be categorized;
    arranging a plurality of category stacks around a perimeter of the source stack with which images from the source stack are associated for automatic categorization, wherein a first plurality of the category stacks comprise a first category set, and a second plurality of the category stacks comprise a second category set, where only one of the first or second category sets is active at one time such that the category stacks of the active category set are viewable in the presentation space and corresponding category stacks from the first category set and the second category set are located at a same location along the perimeter of the source stack;

associating a top image from the source stack with a respective category in the active category set in response to a first user input; and toggling display of the first and second category sets in response to a second user input, such that if the first category set is currently active, the first category set is made inactive and the second category set is made active, and if the second category set is currently active, the second category set is made inactive and the first category set is made active.

2. The method of claim 1 comprising displaying the source stack such that only a top image in the source stack is viewable.

3. The method of claim 1 comprising displaying each of the category stacks such that only a last top image from the source stack that was associated with the corresponding category stack is viewable.

4. The method of claim 1 wherein the first user input for associating the top image from the source stack with a respective category in the active category set comprises a drag-and-drop operation using a pointing device.

5. The method of claim 1 wherein the first user input for associating the top image from the source stack with a respective category in the active category set comprises a keyboard command.

6. The method of claim 5 wherein each of the category stacks in the active category set is associated with a respective key on the keyboard located at a location, in relation to the keys associated with the other category stacks, that is representative of a direction of movement away from the source stack.

7. The method of claim 6 wherein four category stacks are arranged above, below, to the left, and to the right of the source stack, respectively, and wherein the four category stacks are associated with up, down, left, and right arrow keys, respectively, on the keyboard.

8. The method of claim 6 wherein eight category stacks are arranged surrounding the perimeter of the source stack, and wherein the eight category stacks are associated with eight keys on a numeric keypad and the source stack is associated with a center key on the numeric keypad.

9. An executable software product stored on a computer-readable medium containing program instructions for categorizing images, the program instructions for:

displaying a source stack within a presentation space of a display that represents a set of one or more digital images to be categorized;

arranging a plurality of category stacks around a perimeter of the source stack with which images from the source stack are associated for automatic categorization, wherein a first plurality of the category stacks comprise a first category set, and a second plurality of the category stacks comprise a second category set, where only one of the first or second category sets is active at one time such that the category stacks of the active category set are viewable in the presentation space and corresponding category stacks from the first category set and the second category set are located at a same location along the perimeter of the source stack;

associating a top image from the source stack with a respective category in the active category set in response to a first user input; and toggling display of the first and second category sets in response to a second user input, such that if the first category set is currently active, the first category set is made inactive and the second category set is made active, and if the second category set is currently active, the second category set is made inactive and the first category set is made active.

10. The executable software product of claim 9 wherein the program instructions for displaying the source stack comprise displaying the source stack such that only a top image in the source stack is viewable.

11. The executable software product of claim 9 having further program instructions of displaying each of the category stacks such that only a last top image from the source stack that was associated with the corresponding category stack is viewable.

12. The executable software product of claim 9 wherein the first user input for associating the top image from the source stack with a respective category in the active category set comprises a drag-and-drop operation using a pointing device.

13. The executable software product of claim 9 wherein the first user input for associating the top image from the source stack with a respective category in the active category set comprises a keyboard command.

14. The executable software product of claim 13 wherein each of the category stacks in the active category set is associated with a respective key on the keyboard located at a location, in relation to the keys associated with the other category stacks, that is representative of a direction of movement away from the source stack.

15. The executable software product of claim 13 wherein four category stacks are arranged above, below, to the left, and to the right of the source stack, respectively, and wherein the four category stacks are associated with up, down, left, and right arrow keys, respectively, on the keyboard.

16. The executable software product of claim 13 wherein eight category stacks are arranged surrounding the perimeter of the source stack, and wherein the eight category stacks are associated with eight keys on a numeric keypad and the source stack is associated with a center key on the numeric keypad.

17. A method for image categorization comprising:

arranging a plurality of image objects representing respective image files in a source stack within a presentation space of a display;

arranging a first set of category objects representing respective image categories along a perimeter of the source stack of image objects;

arranging a second set of category objects representing respective image categories along the perimeter of the source stack of image objects, wherein arranging the first and second sets of category objects further includes locating corresponding category objects from the first and second sets of category objects in a same location along the perimeter of the source stack of image objects;

visually indicating within the presentation space of the display which one of the first and second category sets is currently indicated a primary set and which one is currently indicated a secondary set;

associating a primary input with a category object in the one of the first and second category sets indicated as the primary set, and associating a secondary input with a category object in the one of the first and second category sets indicated as the secondary set;

in response to receiving the primary input, associating an image file corresponding to a top image object in the source stack with the image category represented by the category object associated with the primary input; and in response to receiving the secondary input:

associating the image file corresponding to the top image object in the source stack with the image category represented by the category object associated with the secondary input;

indicating the one of the first and secondary set currently indicated as the primary set as the secondary set and the one of the first and secondary set currently indicated as the secondary set as the primary set.

18. The method of claim 17 wherein associating the image file corresponding to a top image object in the source stack with the image category further includes, automatically associating metadata with the image file that identifies the image category represented by the category object associated with the received key input.

19. The method of claim 17 wherein arranging the first and second sets of category objects further includes making only the one of the first and second category sets indicated as the primary set active so that the category objects of the primary set are viewable in the presentation space.

20. The method of claim 17 wherein receiving the secondary key input further includes arranging the first and second category sets within the presentation space such that the one of the first and second category sets currently visually indicated as the primary set is visually indicated as the secondary set and the one of the first and second category sets currently visually indicated as the secondary set is visually indicated as the primary set.

21. The method of claim 17 wherein the category objects include text descriptions, and wherein the text descriptions of the category objects in the secondary set are displayed along with the category objects and corresponding text descriptions of the primary set.

22. The method of claim 17 further including arranging the source stack such that only the top image object in the source stack is viewable within the presentation space.

23. The method of claim 22 further including sorting the image objects in the source stack by ascending date of the corresponding image files.

24. The method of claim 22 further including displaying the category objects as respective category stacks into which the top image object from the source stack can be placed for automatic categorization, wherein the category stacks are displayed such that only a top image object in the respective category stack is viewable.

25. The method of claim 17 wherein associating an image file corresponding to a top image object in the stack with the associated category object further includes, associating the top image object in the source stack with more than one category object when a modifier key input is received along with either of the primary input or the secondary input.

26. The method of claim 17 further including, receiving a first venue description;

displaying the first venue description in the presentation space of the display; and in response to each image file corresponding to the top image object in the source stack being associated with one of the category objects, automatically associating the first venue description with the image files as metadata.

27. The method of claim 26 further including, receiving a second venue description;

creating a hierarchical venue description list from the first and second venue descriptions;

displaying the hierarchical venue description list in the presentation space of the display; and in response to each image file corresponding to the top image object in the source stack being associated with one of the category objects, automatically associating each of the venue descriptions in the hierarchy venue description list with the image files as metadata along with category information.

28. The method of claim 27 wherein the venue descriptions and category information metadata associated with each image file are stored as a priority list where the venue descriptions have a higher priority than the category information.

29. The method of claim 28 further including receiving search criteria as one of a first format comprising one of more keywords that span all category information and venue descriptions in the priority list and a second format including one or more keywords and a specification of relationships between the keywords to perform a hierarchical keyword search of the priority list.

30. An executable software product stored on a computer-readable medium containing program instructions for categorizing images, the program instructions for:

arranging a plurality of image objects representing respective image files in a source stack within a presentation space of a display;

arranging a first set of category objects representing respective image categories along a perimeter of the source stack of image objects;

arranging a second set of category objects representing respective image categories along the perimeter of the source stack of image objects, wherein arranging the first and second sets of category objects further includes locating corresponding category objects from the first and second sets of category objects in a same location along the perimeter of the source stack of image objects;

visually indicating within the presentation space of the display which one of the first and second category sets is currently indicated a primary set and which one is currently indicated a secondary set;

associating a primary input with a category object in the one of the first and second category sets indicated as the primary set, and associating a secondary input with a category object in the one of the first and second category sets indicated as the secondary set;

in response to receiving the primary input, associating an image file corresponding to a top image object in the source stack with the image category represented by the category object associated with the primary input; and in response to receiving the secondary input:

associating the image file corresponding to the top image object in the source stack with the image category represented by the category object associated with the secondary input;

indicating the one of the first and secondary set currently indicated as the primary set as the secondary set and the one of the first and secondary set currently indicated as the secondary set as the primary set.

31. The executable software product of claim 30 wherein the category objects include text descriptions, and wherein the text descriptions of the category objects in the secondary set are displayed along with the category objects and corresponding text descriptions of the primary set.

32. The executable software product of claim 30 wherein the instruction for associating an image file corresponding to a top image object in the stack with the associated category object further includes associating the top image object in the source stack with more than one category object when a modifier key input is received along with either of the primary input or the secondary input.

33. The executable software product of claim 30 having further program instructions for:
   receiving a first venue description;
   displaying the first venue description in the presentation space of the display; and
   in response to each image file corresponding to the top image object in the source stack being associated with one of the category objects, automatically associating the first venue description with the image files as metadata.

34. The executable software product of claim 33 having further program instructions for:
   receiving a second venue description;
   creating a hierarchical venue description list from the first and second venue descriptions;
   displaying the hierarchical venue description list in the presentation space of the display; and
   in response to each image file corresponding to the top image object in the source stack being associated with one of the category objects, automatically associating each of the venue descriptions in the hierarchy venue description list with the image files as metadata along with category information.

35. An electronic device, comprising:
   a display;
   a memory for storing a plurality of image files; and
   a processor coupled to the display and memory for executing an image application that allows a user to categorize the plurality of image files, the image application functional for:
      arranging a plurality of image objects representing respective image files in a source stack within a presentation space of the display;
      arranging a first set of category objects representing respective image categories along a perimeter of the source stack of image objects;
      arranging a second set of category objects representing respective image categories along the perimeter of the source stack of image objects, wherein arranging the first and second sets of category objects further includes locating corresponding category objects from the first and second sets of category objects in a same location along the perimeter of the source stack of image objects;
      visually indicating within the presentation space of the display which one of the first and second category sets is currently indicated a primary set and which one is currently indicated a secondary set;
      associating a primary input with a category object in the one of the first and second category sets indicated as the primary set, and associating a secondary input with a category object in the one of the first and second category sets indicated as the secondary set;
      in response to receiving the primary input, associating an image file corresponding to a top image object in the source stack with the image category represented by the category object associated with the primary input; and
      in response to receiving the secondary input:
         associating the image file corresponding to the top image object in the source stack with the image category represented by the category object associated with the secondary input;
         indicating the one of the first and secondary set currently indicated as the primary set as the secondary set and the one of the first and secondary set currently indicated as the secondary set as the primary set.

36. The electronic device of claim 35 wherein the category objects include text descriptions, and wherein the text descriptions of the category objects in the secondary set are displayed along with the category objects and corresponding text descriptions of the primary set.

37. The electronic device of claim 35 wherein associating an image file corresponding to a top image object in the stack with the associated category object further includes associating the top image object in the source stack with more than one category object when a modifier key input is received along with either of the primary input or the secondary input.

38. The electronic device of claim 35 wherein the image application is further functional for:
   receiving a first venue description;
   displaying the first venue description in the presentation space of the display; and
   in response to each image file corresponding to the top image object in the source stack being associated with one of the category objects, automatically associating the first venue description with the image files as metadata.

39. The electronic device of claim 38 wherein the image application is further functional for:
   receiving a second venue description;
   creating a hierarchical venue description list from the first and second venue descriptions;
   displaying the hierarchical venue description list in the presentation space of the display; and
   in response to each image file corresponding to the top image object in the source stack being associated with one of the category objects, automatically associating each of the venue descriptions in the hierarchy venue description list with the image files as metadata along with category information.

* * * * *